(12) United States Patent
Chen

(10) Patent No.: US 11,368,983 B2
(45) Date of Patent: Jun. 21, 2022

(54) RANDOM ACCESS METHOD, USER EQUIPMENT, NETWORK DEVICE AND COMPUTER-READABLE STORAGE MEDIUM

(71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 6 days.

(21) Appl. No.: 16/637,252

(22) PCT Filed: Aug. 7, 2018

(86) PCT No.: PCT/CN2018/099118
§ 371 (c)(1),
(2) Date: Feb. 6, 2020

(87) PCT Pub. No.: WO2019/029508
PCT Pub. Date: Feb. 14, 2019

(65) Prior Publication Data
US 2020/0252969 A1    Aug. 6, 2020

(30) Foreign Application Priority Data
Aug. 10, 2017 (CN) .......................... 201710682147.7

(51) Int. Cl.
H04W 88/08 (2009.01)
H04W 74/08 (2009.01)
(Continued)

(52) U.S. Cl.
CPC ....... *H04W 74/0833* (2013.01); *H04L 1/0026* (2013.01); *H04L 5/0051* (2013.01);
(Continued)

(58) Field of Classification Search
None
See application file for complete search history.

(56) References Cited

U.S. PATENT DOCUMENTS

2012/0033613 A1   2/2012 Lin et al.
2014/0226601 A1*  8/2014 Park ................. H04W 74/0833
                                                    370/329
(Continued)

FOREIGN PATENT DOCUMENTS

CN   105472761 A   4/2016
EP   3419340 A1   4/2017
(Continued)

OTHER PUBLICATIONS

Nokia et al. "NR 4-Step RACH Procedure" 3GPP TSG-RAN WGI#89, RI-1708244, May 5, 2017.
(Continued)

*Primary Examiner* — Brandon M Renner
(74) *Attorney, Agent, or Firm* — Maschoff Brennan

(57) ABSTRACT

A random access method, a UE, a network device and a computer-readable storage medium are provided. The random access method includes: acquiring a candidate RACH resource; selecting a target RACH resource from the candidate RACH resource; and initiating a random access process through the target RACH resource. The candidate (Continued)

RACH resource include at least one of common RACH resource, dedicated RACH resource and additional RACH resource.

17 Claims, 4 Drawing Sheets

(51) Int. Cl.
| | |
|---|---|
| *H04W 76/27* | (2018.01) |
| *H04L 1/00* | (2006.01) |
| *H04L 5/00* | (2006.01) |
| *H04W 36/08* | (2009.01) |
| *H04W 36/32* | (2009.01) |
| *H04W 56/00* | (2009.01) |
| *H04W 80/08* | (2009.01) |

(52) U.S. Cl.
CPC ........... *H04W 36/08* (2013.01); *H04W 36/32* (2013.01); *H04W 56/001* (2013.01); *H04W 76/27* (2018.02); *H04W 80/08* (2013.01)

(56) References Cited

U.S. PATENT DOCUMENTS

| | | | | |
|---|---|---|---|---|
| 2016/0198382 | A1* | 7/2016 | Jung | ..................... H04W 48/16 370/331 |
| 2016/0205705 | A1* | 7/2016 | Chen | ................. H04W 74/0833 370/328 |
| 2017/0265223 | A1 | 9/2017 | Zhang et al. | |
| 2018/0124718 | A1* | 5/2018 | Ng | ........................... H04B 7/15 |
| 2019/0037605 | A1 | 1/2019 | Agiwal et al. | |
| 2019/0387441 | A1* | 12/2019 | Koskela | ................ H04W 36/30 |
| 2020/0296765 | A1* | 9/2020 | Kim | ................. H04W 74/0833 |

FOREIGN PATENT DOCUMENTS

| | | |
|---|---|---|
| WO | 2016/171731 A1 | 10/2016 |
| WO | 2017/075805 A1 | 5/2017 |
| WO | 2017075805 A1 | 5/2017 |

OTHER PUBLICATIONS

European Search Report in Application No. 18843404.7 dated Jul. 7, 2020.
CN Office Action in Application No. 201710682147.7 dated Jan. 2, 2020.
CN Office Action in Application No. 201710682147.7 dated Mar. 20, 2020.
CN Office Action in Application No. 201710682147.7 dated Jun. 15, 2020.
"Discussion on RACH Procedure" 3GPP TSG RAN WG1 NR ad hoc Meeting, Jan. 16, 2017.
"4-step random access procedure" 3GPP TSG RAN WG1 #89 Meeting, May 15, 2017.
"NR 4-step RACH procedure" 3GPP TSG-RAN WG1#89, May 15, 2017.
"Handover in NR Considering Multiple-beam Operation" 3GPP TSG-RAN WG2 NR#2, Jun. 27, 2017.
"Baseline handover procedure for inter gNB handover in NR" 3GPP TSG-RAN WG2 Adhoc#2 on NR, Jun. 27, 2017.
"Allocation of appropriate RACH resources for handover" 3GPP TSG-RAN WG2 Adhoc#2 on NR, Jun. 27, 2017.
"Basic handover procedure in NR" 3GPP TSG-RAN WG2 #AdHoc Meeting, Jun. 27, 2017.
"Further details of handover execution in NR" 3GPP TSG-RAN WG2 Ad Hoc on NR, Jun. 27, 2017.
"Text proposal to TS 38.300 on baseline handover procedure for inter gNB handover in NR" 3GPP TSG-RAN WG2 Adhoc#2 on NR, Jun. 27, 2017.
Written Opinion and International Search Report in Application No. PCT/CN2018/099118 dated Feb. 27, 2020.
European Office Action dated Jan. 20, 2022 as received in application No. 18843404.7.

* cited by examiner

RANDOM ACCESS METHOD, USER EQUIPMENT, NETWORK DEVICE AND COMPUTER-READABLE STORAGE MEDIUM

CROSS-REFERENCE TO RELATED APPLICATION

The present application is the U.S. national phase of PCT Application No. PCT/CN2018/099118 filed on Aug. 7, 2018, which claims a priority of the Chinese patent application No. 201710682147.7 filed on Aug. 10, 2017, which is incorporated herein by reference in its entirety.

TECHNICAL FIELD

The present disclosure relates to the field of communication technology, in particular to a random access method, a User Equipment (UE), a network device and a computer-readable storage medium.

BACKGROUND

In a $5^{th}$-Generation (5G) mobile communication system, also called as New Radio (NR) system, a downlink transmission rate is up to 20 Gbps, and an uplink transmission rate is up to 10 Gbps. Through high-frequency communication, a larger system bandwidth and a smaller antenna size may be provided, so as to facilitate the deployment of massive antennae in a base station and a UE. However, during the high-frequency communication, there are such disadvantages as relatively large path loss, being susceptible to interference and weak link. In addition, a relatively large antenna gain may be provided through the massive antenna technique. Hence, the combination of the high-frequency communication with the massive antenna technique is an inevitable trend of the 5G mobile communication system. In a massive antenna system, in order to acquire a larger coverage distance for a transmitted signal, the signal may be transmitted via beams in a concentrated manner. However, due to a narrow coverage range of the beams, the signal may be transmitted via beams in different directions within different time periods, so as to acquire a larger coverage range and a larger coverage distance.

Further, in the 5G mobile communication system, a downlink signal is transmitted by the base station through beam scanning. When an uplink random access process is initiated by the UE, the base station needs to configure an uplink random access resource, i.e., a Physical Random Access Channel (PRACH) resource, corresponding to each downlink beam for the UE. A reference signal corresponding to the downlink beam includes a Channel State Information Reference Signal (CSI-RS) and/or a Synchronization Signal (SS) block. After a downlink reception beam has been selected, the UE may perform a random access process on the uplink PRACH resource corresponding to the downlink reception beam. Hence, in the 5G mobile communication system, a new random access resource, i.e., the beam, has been introduced. During the configuration of the random access resource, it is necessary to simultaneously specify a beam resource or an SS block corresponding thereto. When the random access process is performed by the UE and the UE is configured with a dedicated Random Access Channel (RACH) resource and a common RACH resource simultaneously, it is difficult for the UE to select the RACH resource. In addition, the dedicated RACH resource and the common RACH resource may be associated with different CSI-RSs and/or SS blocks corresponding to different beams. At this time, it is impossible to determine the RACH resource to be actually selected for the random access process.

SUMMARY

An object of the present disclosure is to provide a random access method, a UE, a network device and a computer-readable storage medium, so as to solve the problem in the related art where it is impossible to determine the RACH resource to be actually selected for the random access process when there are various RACH resource concurrently.

In one aspect, the present disclosure provides in some embodiments a random access method for a UE, including: acquiring a candidate RACH resource; selecting a target RACH resource from the candidate RACH resource, the candidate RACH resource including at least one of a common RACH resource, a dedicated RACH resource or an additional RACH resource; and initiating a random access process through the target RACH resource.

In another aspect, the present disclosure provides in some embodiments a UE, including: a first acquisition module configured to acquire a candidate RACH resource; a selection module configured to select a target RACH resource from the candidate RACH resource, the candidate RACH resource including at least one of a common RACH resource, a dedicated RACH resource or an additional RACH resource; and a processing module configured to initiate a random access process through the target RACH resource.

In yet another aspect, the present disclosure provides in some embodiments a UE, including a processor, a memory, and a computer program stored in the memory and executed by the processor. The processor is configured to execute the computer program so as to implement the above-mentioned random access method.

In still yet another aspect, the present disclosure provides in some embodiments a computer-readable storage medium storing therein a computer program. The computer program is executed by a processor so as to implement the above-mentioned random access method.

In still yet another aspect, the present disclosure provides in some embodiments a random access method for a network device, including: configuring a candidate RACH resource for a random access process for a UE; and transmitting the candidate RACH resource to the UE so that the UE selects a target RACH resource for initiating the random access process from the candidate RACH resource, the candidate RACH resource including at least one of a common RACH resource, a dedicated RACH resource or an additional RACH resource.

In still yet another aspect, the present disclosure provides in some embodiments a network device, including: a configuration module configured to configure a candidate RACH resource for a random access process for a UE; and a transmission module configured to transmit the candidate RACH resource to the UE so that the UE selects a target RACH resource for initiating the random access process from the candidate RACH resource, the candidate RACH resource including at least one of a common RACH resource, a dedicated RACH resource or an additional RACH resource.

In still yet another aspect, the present disclosure provides in some embodiments a network device, including a processor, a memory, and a computer program stored in the memory and executed by the processor. The processor is configured to execute the computer program so as to implement the above-mentioned random access method.

In still yet another aspect, the present disclosure provides in some embodiments a computer-readable storage medium storing therein a computer program. The computer program is executed by a processor so as to implement the above-mentioned random access method.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
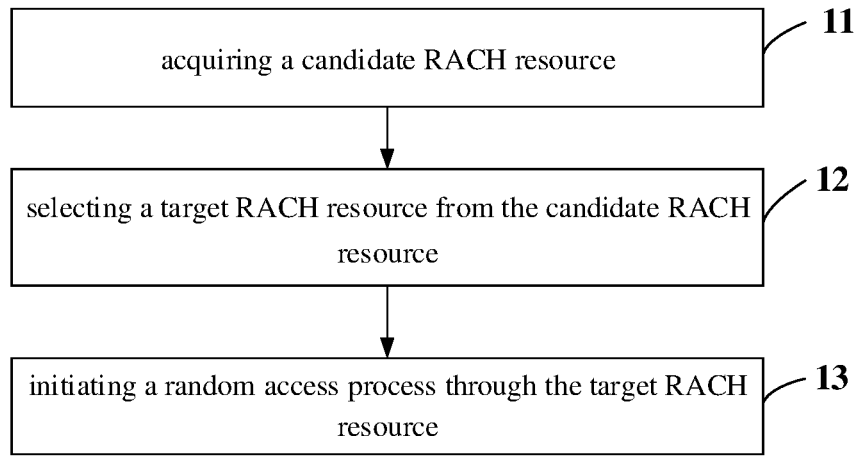
FIG. 1 is a flow chart of a random access method for a UE according to one embodiment of the present disclosure.

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device.

An object of the present disclosure is to provide a random access method, a UE, a network device and a computer-readable storage medium, so as to solve the problem in the related art where it is impossible to determine the RACH resource to be actually selected for the random access process when there are various RACH resources concurrently.

Figure 2:
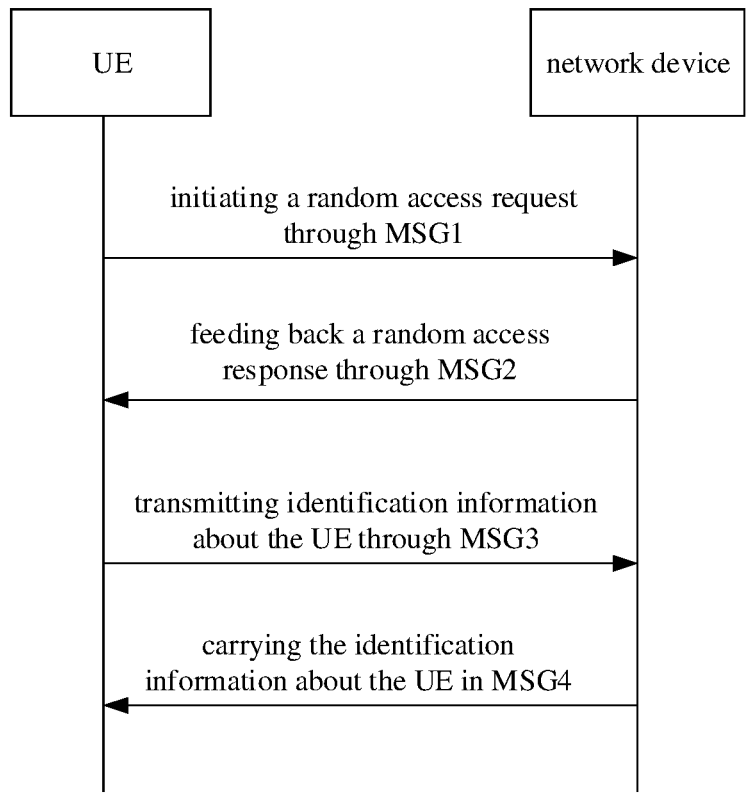
FIG. 2 is a schematic view showing a contention-based random access process.
Figure 3:
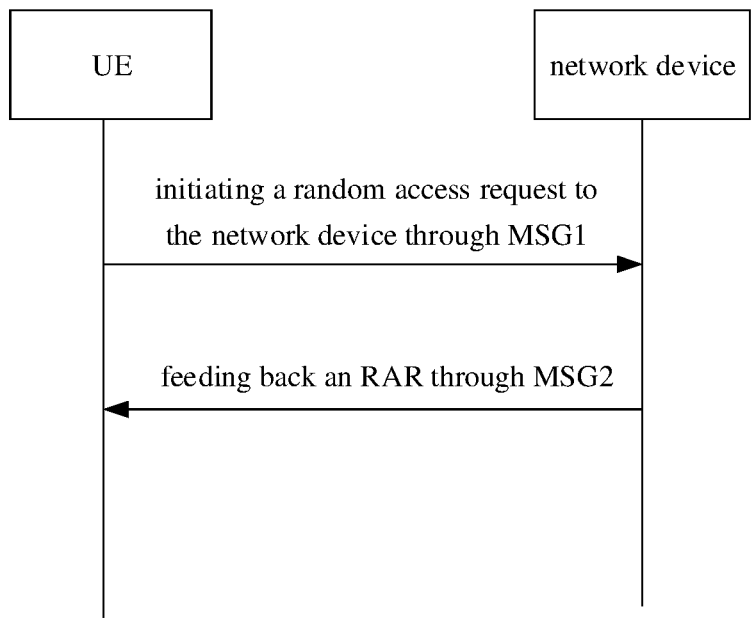
FIG. 3 is a schematic view showing a contention-free-based random access process.

FIG. 1 is a flow chart of a random access method for a UE according to one embodiment of the present disclosure, FIG. 2 is a schematic view showing a contention-based random access process, and FIG. 3 is a schematic view showing a contention-free-based random access process.

As shown in FIG. 2, the random access method for the UE may include Steps 11 to 13.

Step 11: acquiring a candidate RACH resource.

In both a conventional LTE system and a 5G mobile communication system, it is necessary to achieve various purposes via a random access process, e.g., the initial Radio Resource Control (RRC) connection establishment, the RRC connection re-establishment, handover, the arrival of downlink data with downlink asynchronization, the arrival of uplink data with uplink asynchronization, the switch of the UE from an inactive state to an active state, and the uplink synchronization acquisition of a Secondary cell (Scell). Hence, a network device may configure different RACH resources for the UE depending on different purposes for the random access. Here, the acquiring the candidate RACH resources may especially include acquiring candidate RACH resources for a random access process with a specific purpose. The candidate RACH resources may include at least one of common RACH resources, dedicated RACH resources and additional RACH resources.

To be specific, Step 11 may include acquiring the candidate RACH resources and SS blocks and/or CSI-RSs associated with the candidate RACH resources. In other words, there is a mapping between each candidate RACH resource and a corresponding SS block and/or CSI-RS, i.e., the candidate RACH resources and the SS blocks and/or CSI-RSs may occur in pairs. When the candidate RACH resources have been configured by the network device for the UE, there must exist an SS block and/or CSI-RS corresponding to each candidate RACH resource configured by the network device or by default.

The common RACH resources may include preamble codes, time-domain resources and/or frequency-domain resources carried in a system message (System Information Block (SIB) 2 or a an RRC (SI)) or an RRC message issued by the network device for the random access. To be specific, the common RACH resources may be shared RACH resources with a specific purpose and configured by the network device for a plurality of UEs, and may be used by different UEs through contention. In addition, the common RACH resources may also be RACH resources configured by the network device for one UE and shared by random access processes with different purposes. The common RACH resources may be understood as default resources for the random access process performed by the UE.

Further, the dedicated RACH resources may include at least one of: (1) preamble codes, time-domain resources and/or frequency resources reserved by the network device for the random access process, especially RACH resources reserved by the network device for the random access process with a specific purpose, e.g., RACH resources reserved for the random access process with a handover function; (2) RACH resources reserved by the network device for the random access process and associated with the SS block and/or the CSI-RS, especially RACH resources reserved by the network device for the random access process with a specific purpose and associated with dedicated SS blocks and/or CSI-RSs, e.g., RACH resources reserved for the random access process with a handover function and associated with the dedicated SS blocks and/or CSI-RSs; and (3) RACH resources reserved by the network device for the random access process and selected from the common RACH resources, i.e., preamble codes, time-domain resources and/or frequency-domain resources reserved by the network device for the random access process and selected from the common RACH resources. In other words, the dedicated RACH resources may be reserved resources selected from the common RACH resources, i.e., at least one of the frequency-domain resources, the frequency-domain resources and the preamble codes may be selected from the common RACH resources. It should be appreciated that, when one RACH resource serves as a dedicated RACH resource and a common RACH resource, the corresponding SS block and/or CSI-RS associated with the RACH resource as the dedicated RACH resource may be different from the corresponding SS block and/or CSI-RS associated with the RACH resource associated with the RACH resource as the common RACH resource.

The above-mentioned dedicated RACH resources may be applied to a contention-free-based random access (CFRA, also called as non-contention-based random access) process, or a contention-based random access (CBRA) process. When each dedicated RACH resource is an RACH resource separately reserved for each UE, it may correspond to the CFRA process, and when the same reserved RACH resource is used by a plurality of UEs, it may correspond to the CBRA process.

Further, the additional RACH resources may include at least one of: (1) RACH resources reserved by the network device for the random access process, especially RACH resources for the random access process with another purpose reserved by the network device for the random access process with a specific purpose, e.g., RACH resources for the random access process with an RRC connection re-establishment function reserved by the network device for the random access process with the handover function; (2) RACH resources other than the common RACH resources and the dedicated RACH resources, i.e., new RACH positions (including time-domain or frequency-domain positions) other than the periodic common RACH resources and periodic dedicated RACH resources; and (3) RACH resources associated with the other SS blocks and/or CSI-RSs. The other SS blocks may be SS blocks other than the SS blocks associated with the common RACH resources and the dedicated RACH resources, and the other CSI-RSs may be CSI-RSs other than the CSI-RSs associated with the common RACH resources and the dedicated RACH resources. In other words, the additional RACH resources may be the RACH resources associated with the SS blocks and/or CSI-RSs other than the SS blocks and/or CSI-RSs associated with the common RACH resources and the dedicated RACH resources.

Identically, the above-mentioned additional RACH resources may be applied to the CFRA process or the CBRA process. The SS blocks and the CSI-RSs corresponding to the common RACH resources, the dedicated RACH resources and the additional RACH resources may also be any other reference signals.

Step 12: selecting a target RACH resource from the candidate RACH resource.

After the acquisition of the candidate RACH resource, the UE needs to select one or more candidate RACH resources for the random access process. It should be appreciated that, the candidate RACH resources may include contention RACH resources and contention-free resources.

To be specific, Step 12 may be implemented in one of the following three modes.

Mode 1: a target RACH resource may be selected from the candidate RACH resources in accordance with the SS blocks and/or CSI-RSs associated with the candidate RACH resources.

To be specific, each candidate RACH resource associated with the SS block and/or the CSI-RS whose signal quality is higher than a first threshold may be determined as the target RACH resource. The contention-free RACH resource is advantageous over the contention RACH resource, so each contention-free RACH resource in the candidate RACH resources associated with the SS blocks and/or the CSI-RSs whose signal quality is higher than the first threshold may be determined as the target RACH resource.

Mode 2: the target RACH resource may be selected from the candidate RACH resources in accordance with beam reception quality of a beam corresponding to each candidate RACH resource.

To be specific, the candidate RACH resources corresponding to first N beams with the highest beam reception quality may be determined as the target RACH resource, where N is a positive integer. Identically, the contention-free RACH resource is advantageous over the contention RACH resource, so each contention-free RACH resource in the candidate RACH resources corresponding to the first N beams with the highest beam reception quality may be determined as the target RACH resource.

Mode 3: the target RACH resource may be selected from the candidate RACH resources in accordance with a predetermined priority level.

Here, the priority level may refer to a priority level of each of the contention RACH resources and the contention-free RACH resources in the candidate RACH resources. The contention-free RACH resource is advantageous over the contention RACH resource, so one or more contention-free RACH resources in the candidate RACH resources may be determined as the target RACH resource.

Step 13: initiating the random access process through the target RACH resource.

Conventional random access processes may include contention-based random access process and contention-free-based random access process. The random access process in Step 13 may be the contention-based random access process or the contention-free-based random access process. It should be appreciated that, in both the contention-based random access process and the contention-free-based random access process, the preamble codes for the random access may be transmitted to the network device through the target RACH resource. As shown in FIG. 2, the contention-based random access process may include four steps. The UE may initiate a random access request to the network device through a message 1 (MSG1), and the random access request may be carried in each preamble code. Upon the receipt of the random access request, the network deice may transmit a Random Access Response (RAR) to the UE through a message 2 (MSG2). Due to such a problem that a same preamble code is transmitted on a same PRACH resource in the contention-based random access process, the UE, upon the receipt of the message 2, further needs to transmit a message 3 (MSG3) to the network device in accordance with uplink grant. Identification information about the UE may be carried in the message 3, and a contention resolution timer may be started when the message 3 is transmitted. When a message 4 (MSG4) has been received from the network device before the expiration of the contention resolution timer, it means that contention resolution is performed successfully by the UE. Identification information of the UE may be carried in the message 4, and the UE may determine whether its contention is successful in accordance with the identification information.

In the contention-free-based random access process, as shown in FIG. 3, the UE may initiate the random access request to the network device through MSG1, and the random access request may be carried in each preamble code. Upon the receipt of the random access request, the network device may transmit the RAR to the UE through the MSG2. Upon the receipt of the RAR, the UE may determine that the random access process is performed successfully.

Further, the UE may have different capabilities to support monitoring a plurality of downlink beams simultaneously. When the UE has a capability of support monitoring P downlink beams simultaneously, the transmitting the preamble codes for the random access to the network device through the target RACH resource may include: transmitting X preamble codes to the network device on the target RACH resource before the end of an RAR window; and transmitting the other preamble codes to the network device after the end of the RAR window. X and P are each a positive integer, and X is smaller than or equal to P. The other preamble codes may be preamble codes other than the P preamble codes. In other words, when the UE has the capability to support monitoring P downlink beams, the UE may transmit one preamble code on the target RACH resource, transmit P-1 preamble codes before the end of the RAR window, and transmit the other preamble codes after the end of the RAR window, on the premise that the quantity of the RARs to be monitored simultaneously is not greater than P.

Further, in both the contention-based random access process and the contention-free-based random access process, subsequent to transmitting the preamble codes for the random access to the network device through the target RACH resource, the random access method may further include monitoring the RAR on a downlink beam corresponding to the SS block and/or CSI-RS associated with each RACH resource for transmitting the corresponding preamble code, i.e., monitoring the RAR (or the MSG2) on the SS block and/or CSI-RS resource associated with target RACH resource.

When the UE has a capability to support monitoring Q downlink beams simultaneously, the monitoring each RAR on the downlink beam corresponding to the SS block and/or CSI-RS associated with the target RACH resource may include: monitoring Y RARs on the downlink beams corresponding to the SS blocks and/or CSI-RSs associated with the target RACH resource for transmitting Y preamble codes, where Q and Y are each a positive integer, and Y is smaller than or equal to Q; or monitoring, on the UE's own initiative, Q RARs on the downlink beams corresponding to the SS blocks and/or CSI-RSs associated with the target RACH resources for transmitting Y' preamble codes, where Q is greater than M.

When the UE is merely capable of monitoring one downlink beam at the same time, the UE may monitor a corresponding RAR on a downlink beam corresponding to the SS block and/or CSI-RS associated with the RACH resource for transmitting the preamble code. In a scenario where a plurality of preamble codes is transmitted, the UE may monitor the RAR on one of the downlink beams corresponding to the SS blocks and/or CSI-RSs associated with RACH resources for transmitting the preamble codes.

Identically, when the UE is merely capable of monitoring Q downlink beams at the same time, in a scenario there the quantity of the transmitted preamble codes is not greater than Q, the UE may monitor respective RARs on the downlink beams corresponding to the SS blocks and/or CSI-RSs associated with the RACH resource for transmitting the preamble codes. In a scenario where the quantity of the preamble codes is greater than Q, the UE may select Q downlink transmission beams from the downlink transmission beams corresponding to the SS blocks and/or CSI-RSs associated with the RACH resources for transmitting the preamble codes, and monitor the respective RARs on the Q downlink transmission beams.

Further, Step 12 may further include determining each candidate RACH resource associated with the SS block and/or CSI-RS acquired from the network device as the target RACH resource. Correspondingly, Step 13 may further include transmitting the preamble code for the random access to the network device through each RACH resource associated with the SS block and/or CSI-RS acquired from the network device. In other words, each RACH resource associated with the received SS block and/or CSI-RS may be determined as the target RACH resource, and then the preamble code may be transmitted through the corresponding resource. To be specific, when the UE has received L SS blocks and/or CSI-RSs, before the end of the RAR window, the UE may transmit L' preamble codes to the network device through the RACH resources associated with the acquired SS blocks and/or CSI-RSs, where L and L' are each a positive integer, and L' is smaller than L. In other words, the UE may transmit one preamble code on the target RACH resource, then transmit L-1 preamble codes before the end of the RAR window, and then transmit the other preamble codes after the end of the RAR window, on the premise that the quantity of the RARs to be monitored simultaneously is not greater than L.

The description about the random access method in generic scenarios has been given hereinabove, and the random access method will be described hereinafter in conjunction with a handover scenario.

In a conventional LTE system, a handover command needs to carry necessary configuration for the access to a target cell, so as to reduce the time delay caused by the handover and rapidly access the target cell during the handover. To be specific, a source base station may transmit a handover request to a target base station. The target base station may perform access control, transmit a handover acknowledgement message to the source base station after the access is allowed, and transmit configuration information necessary for the UE to access the target base station to the source base station through the handover acknowledgement message. The source base station may transmit a handover command to the UE, and the handover command may carry the configuration information from the target base station. Upon the receipt of the handover command, the UE may perform cell handover, and after the cell handover is performed successfully, transmit a handover completion message to the target base station.

In some embodiments of the present disclosure, Step 11 may include acquiring the candidate RACH resources for the random access process with a handover function. Further, the acquiring the candidate RACH resources for the random access process with the handover function may be implemented in any of the following three modes.

Mode 1: the acquiring the candidate RACH resources for the random access process with the handover function may include receiving a handover command from the network device, and acquiring the candidate RACH resources for the random access process with the handover function from the handover command During the handover, the UE needs to acquire at least one of the common RACH resources, the dedicated RACH resources and the additional RACH resources, or the SS blocks or CSI-RSs associated therewith. The candidate RACH resources may be acquired from the received handover command. To be specific, a transmission procedure will be described as follows. After an RRC message has been generated, the target base station may transmit the handover command carrying the RRC message to the source base station via a transparent container, and then the source base station may transmit it to the UE. Further, a handover command carrying at least a part of (all of or a part of) minimum SI maybe received from the network device. In other words, a part of or all of information in the minimum SI may be included in the handover command and transmitted to the UE via RRC signaling.

Mode 2: the acquiring the candidate RACH resources for the random access process with the handover function may include receiving high-layer signaling (i.e., the RRC message) from the network side device, and acquiring the candidate RACH resources for the random access process with the handover function from the high-layer signaling. To be specific, the target base station may transmit the handover command to the source base station, and the source base station may transmit the RRC signaling including the handover command to the UE. Specifically, the UE may receive the high-layer signaling carrying a mobility control message from the network device, and acquire the candidate RACH resources for the random access process with the handover function from the mobility control message carried in the high-layer signaling. In other words, the network device may transmit the candidate RACH resources carried in the mobility control message to the UE.

Mode 3: the acquiring the candidate RACH resources for the random access process with the handover function may include acquiring neighboring cell SI, and acquiring the candidate RACH resources for the random access process with the handover function from the neighboring cell SI. Here, the neighboring cell SI may be acquired through directly receiving the neighboring cell SI, or reading the neighboring cell SI stored in the UE.

In the random access process in a specific handover scenario, Step 12 may include: acquiring first M RACH resources that meet a predetermined condition from the candidate RACH resources upon the receipt of the handover command; and determining the first M RACH resources as the target RACH resource, where M is an integer greater than or equal to 1. In other words, when there is a plurality of available candidate RACH resources, the UE may select one or more RACH resources right after receiving the handover command as the target RACH resource.

To be specific, the acquiring the first M RACH resources that meet the predetermined condition from the candidate RACH resources upon the receipt of the handover command may be implemented as follows.

The first M candidate RACH resources right after receiving the handover command may be acquired from the candidate RACH resources. In other words, upon the receipt of the handover command, the first M candidate RACH resources may be monitored continuously, and selected as the target RACH resource.

Alternatively, first M contention-free RACH resources right after receiving the handover command may be acquired from the candidate RACH resources. The contention-free RACH resource is advantageous over the contention RACH resource, so one or more contention-free RACH resources right after receiving the handover command, may be selected from the latest candidate RACH resources as the target RACH resource.

Alternatively, first M RACH resources associated with the SS blocks and/or CSI-RSs whose signal quality is greater than a predetermined threshold may be selected from the candidate RACH resources upon the receipt of the handover command. In other words, the signal quality of the downlink SS blocks and/or the CSI-RSs may be further taken into consideration. Upon the receipt of the handover command, the UE may continue to monitor the first M candidate RACH resources associated with the SS blocks and/or CSI-RSs whose signal quality is greater than the predetermined threshold, and select the first M candidate RACH resources as the target RACH resource.

Alternatively, first M contention-free RACH resources associated with the SS blocks and/or CSI-RSs whose signal quality is greater than the predetermined threshold may be acquired from the candidate RACH resources upon the receipt of the handover command, and then determined as the target RACH resource. The contention-free RACH resource is advantageous over the contention RACH resource, the first M contention-free RACH resources right after receiving the handover command may be selected from the latest candidate RACH resources associated with the SS blocks and/or CSI-RSs whose signal quality is greater than the predetermined threshold and determined as the target RACH resource.

Further, when beam reception quality of each beam is to be taken into consideration, first M RACH resources with best beam reception quality may be acquired from the candidate RACH resources upon the receipt of the handover command. In other words, the UE may select the first N candidate RACH resources right after receiving the handover command from the candidate RACH resources with the best beam reception quality as the target RACH resource.

Alternatively, first M contention-free RACH resources with the best beam reception quality may be acquired from the candidate RACH resources upon the receipt of the handover command. The contention-free RACH resource is advantageous over the contention RACH resource, so the first M contention-free RACH resources right after receiving the handover command may be selected from the candidate RACH resources with the best beam reception quality as the target RACH resource.

According to the random access method in the embodiments of the present disclosure, the UE may acquire the candidate RACH resources configured by the network device, determine the target RACH resource from the candidate RACH resources, and initiate the random access process through the target RACH resource. As a result, it is able for the UE to rapidly and reliably access the network through an appropriate random access resource when there are various random access resources concurrently, thereby to achieve a desired specific purpose, e.g., RRC connection, RRC connection re-establishment and handover. Particularly, in the handover scenario, it is able for the UE to rapidly access the target cell, thereby to achieve the handover process rapidly.

The random access method in different scenarios has been described hereinbefore. The corresponding UE will be described hereinafter in conjunction with the drawings and embodiments.

Figure 4:
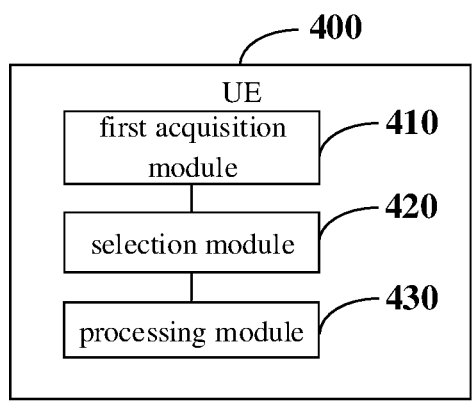
FIG. 4 is a schematic view showing the UE according to one embodiment of the present disclosure.

As shown in FIG. 4, the present disclosure further provides in some embodiments a UE 400 capable of implementing the above-mentioned random access method with a same technical effect. As shown in FIG. 4, the UE 400 includes: a first acquisition module 410 configured to acquire candidate RACH resources; a selection module 420 configured to select a target RACH resource from the candidate RACH resources, the candidate RACH resources including at least one of common RACH resources, dedicated RACH resources and additional RACH resources; and a processing module 430 configured to initiate a random access process through the target RACH resource.

The common RACH resource may include preamble codes, time-domain resources and/or frequency-domain resources carried in a system message or an RRC message issued by the network device for the random access process.

The dedicated RACH resource may include at last one of: preamble codes, time-domain resources and/or frequency resources reserved by the network device for the random access process; RACH resources reserved by the network device for the random access process and associated with dedicated SS blocks and/or the CSI-RSs; and RACH resources reserved by the network device for the random access process and selected from the common RACH resources.

The RACH resources reserved by the network device for the random access process and selected from the common RACH resources may include preamble codes, time-domain resources and/or frequency-domain resources reserved by the network device for the random access process and selected from the common RACH resources.

The first acquisition module 410 may include a first acquisition sub-module configured to acquire the candidate RACH resources and the SS blocks and/or CSI-RSs associated with the candidate RACH resources.

The additional RACH resource may include at least one of: RACH resources reserved by the network device for the random access process; RACH resources other than the common RACH resources and the dedicated RACH resources; and RACH resources associated with the other SS blocks and/or CSI-RSs. The other SS blocks may be SS blocks other than the SS blocks associated with the common RACH resources and the dedicated RACH resources, and the other CSI-RSs may be CSI-RSs other than the CSI-RSs associated with the common RACH resources and the dedicated RACH resources.

The first acquisition module 410 may include a second acquisition sub-module configured to acquire the candidate RACH resources for the random access process with a handover function.

The second acquisition sub-module may include: a first acquisition unit configured to receive a handover command from the network device and acquire the candidate RACH resources for the random access process with the handover function from the handover command; or a second acquisition unit configured to receive high-layer signaling from the network device and acquire the candidate RACH resources for the random access process with the handover function from the high-layer signaling; or a third acquisition unit configured to acquire a neighboring cell system message and acquire the candidate RACH resources for the random access process with the handover function from the neighboring cell system message.

The second acquisition unit may include: a first reception sub-unit configured to receive the high-layer signaling carrying a mobility control message from the network device; and a first acquisition sub-unit configured to acquire the candidate RACH resources for the random access process with the handover function from the mobility control message carried in the high-layer signaling.

The first acquisition module 410 may include a second reception sub-unit configured to receive the handover command carrying at least a part of minimum SI from the network device.

The selection module may include: a third acquisition sub-module configured to acquire first M RACH resources right after receiving the handover command from the candidate RACH resources, M being an integer greater than or equal to 1; and a first determination sub-module configured to determine the target RACH resource in accordance with the first M RACH resources.

The third acquisition sub-module may include: a fourth acquisition unit configured to acquire the first M candidate RACH resources right after receiving the handover command from the candidate RACH resources; or a fifth acquisition unit configured to acquire first M contention-free RACH resources right after receiving the handover command from the candidate RACH resources; or a sixth acquisition unit configured to acquire first M RACH resources associated with SS blocks and/or CSI-RSs whose signaling quality is greater than a predetermined threshold right after receiving the handover command from the candidate RACH resources; or a seventh acquisition unit configured to acquire first M contention-free RACH resources associated with the SS blocks and/or CSI-RSs whose signal quality is greater than the predetermined threshold right after receiving the handover command from the candidate RACH resources as the target RACH resource; or an eighth acquisition unit configured to acquire first M RACH resources with best beam reception quality right after receiving the handover command from the candidate RACH resources; or a ninth acquisition unit configured to acquire first M contention-free RACH resources with the best beam reception quality right after receiving the handover command from the candidate RACH resources.

The third acquisition unit may include a third reception sub-unit configured to receive the neighboring cell system message, or a reading sub-unit configured to read the neighboring cell system message stored in the UE.

The selection module may include: a first selection sub-module configured to select the target RACH resource from the candidate RACH resources in accordance with the SS blocks and/or CSI-RSs associated with the candidate RACH resources; or a second selection sub-module configured to select the target RACH resource from the candidate RACH resources in accordance with the beam reception quality of downlink beams corresponding to the candidate RACH resources; or a third selection sub-module configured to select the target RACH resource from the candidate RACH resources in accordance with a predetermined priority level.

The first selection sub-module may include a first determination unit configured to determine the candidate RACH resources associated with the SS blocks and/or CSI-RSs whose signal quality is greater than a first threshold as the target RACH resource.

The first determination unit may include a first determination sub-unit configured to determine contention-free RACH resources in the candidate RACH resources associated with the SS blocks and/or CSI-RSs whose signal quality is greater than the first threshold as the target RACH resource.

The second selection sub-module may include a second determination unit configured to determine the candidate RACH resources corresponding to first N beams with the best beam reception quality as the target RACH resource, where N is a positive integer.

The second determination unit may include a second determination sub-unit configured to determine contention-free RACH resources in the candidate RACH resources corresponding to the first N beams with the best beam reception quality as the target RACH resource.

The processing module may include a first transmission sub-module configured to transmit the preamble codes for the random access process to the network device through the target RACH resource.

The first transmission sub-module may include: a first transmission unit configured to, when the UE has a capability of monitoring P downlink beams simultaneously, transmit X preamble codes to the network device through the target RACH resource before the end of an RAR window, X and P being each a positive integer, and X being smaller than or equal to P; and a second transmission unit configured to transmit other preamble codes to the network device after the end of the RAR window. The other preamble codes may include preamble codes other than the P preamble codes.

The processing module may further include a monitoring sub-module configured to monitor an RAR on a downlink beam corresponding to the SS block and/or CSI-RS associated with each RACH resource for the transmission of the preamble code.

The monitoring sub-module may include: a first monitoring unit configured to, when the UE has a capability of monitoring Q downlink beams simultaneously, monitor Y RARs on the downlink beams corresponding to the SS blocks and/or CSI-RSs associated with the target RACH resources for the transmission of Y preamble codes, Q and Y being each a positive integer, and Y being smaller than or equal to Q; and a second monitoring unit configured to select on its own initiative to monitor Q RARs on the downlink beams corresponding to the SS blocks and/or CSI-RSs associated with the target RACH resources for the transmission of Y' preamble codes, Q being greater than M.

The selection module may further include a fourth selection sub-module configured to determine the candidate RACH resources associated with the SS blocks and/or CSI-RSs acquired during downlink transmission as the target RACH resources.

The processing module may include a second transmission sub-module configured to transmit the preamble codes for the random access process to the network device through the candidate RACH resources associated with the SS blocks and/or CSI-RSs acquired during downlink transmission.

The second transmission sub-module may include a third transmission unit configured to, when L SS blocks and/or CSI-RSs have been received by the UE, transmit L' preamble codes to the network device through the RACH resources associated with the SS blocks and/or CSI-RSs acquired during downlink transmission before the end of the RAR window, where L and L' are each a positive integer, and L' is smaller than or equal to L.

It should be appreciated that, according to the embodiments of the present disclosure, the UE may acquire the candidate RACH resources configured by the network device, determine the target RACH resource from the candidate RACH resources, and initiate the random access process through the target RACH resource. As a result, it is able for the UE to rapidly and reliably access the network through an appropriate random access resource when there are various random access resources concurrently, thereby to achieve a desired specific purpose, e.g., RRC connection, RRC connection re-establishment and handover. Particularly, in the handover scenario, it is able for the UE to rapidly access the target cell, thereby to achieve the handover process rapidly.

In order to achieve the above-mentioned purposes, the present disclosure further provides in some embodiments a UE which includes a processor, a memory, and a computer program stored in the memory and executed by the processor. The processor is configured to execute the computer program so as to implement the above-mentioned random access method.

The present disclosure further provides in some embodiments a computer-readable storage medium storing therein a computer program. The computer program is executed by a processor so as to implement the above-mentioned random access method.

The computer-readable storage medium may be a volatile or non-volatile storage medium, or a transient or non-transient storage medium.

Figure 5:
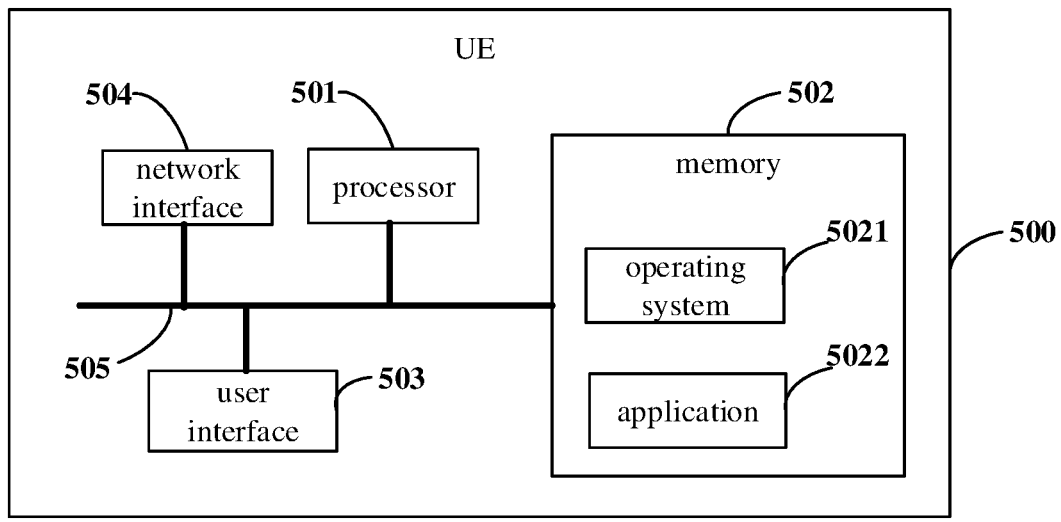
FIG. 5 is a block diagram of the UE according to one embodiment of the present disclosure.

The present disclosure further provides in some embodiments a UE 500 which, as shown in FIG. 5, includes at least one processor 501, a memory 502, a user interface 503 and a network interface 504. The components of the UE 500 may be coupled together through a bus system 505. It should be appreciated that, the bus system 505 is configured to achieve connection and communication among the components. Apart from a data bus, the bus system 1105 may further include a power source bus, a control bus and a state signal bus. For clarification, all these buses in FIG. 5 may be collectively called as bus system 505.

The user interface 503 may include a display, a keyboard or a pointing device (e.g., mouse, track ball, touch plate or touch panel).

It should be appreciated that, the memory 502 may be a volatile memory, a nonvolatile memory or both. The non-volatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 502 intends to include, but not limited to, the above-mentioned and any other appropriate memories.

In a possible embodiment of the present disclosure, the following elements may be stored in the memory 502: an executable module or data structure, a subset or an extended set thereof, an operating system 5021 and an application 5022.

The operating system 5021 may include various system programs, e.g., a framework layer, a core layer and a driving layer, so as to implement various basic services and process hardware-based tasks. The application 5022 may include various applications, e.g., Media Player and Browser, so as to implement various application services. The programs for implementing the above-mentioned method may be included in the application 5022.

In the embodiments of the present disclosure, the UE 500 may further include a computer program stored in the memory 502 and executed by the processor 501, e.g., a computer program in the application 5022. The computer program may be executed by the processor 501, so as to: acquire a candidate RACH resource; select a target RACH resource from the candidate RACH resource, the candidate RACH resource including at least one of common RACH resources, dedicated RACH resources and additional RACH resources; and initiate a random access process through the target RACH resource.

The above-mentioned method may be applied to, or implemented by, the processor 501. The processor 501 may be an integrated circuit (IC) having a signal processing capability. During the implementation, the steps of the above-mentioned method may be completed through an integrated logic circuit of hardware in the processor 501 or instructions in the form of software. The processor 501 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 502, and the processor 501 may read information stored in the memory 502 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The common RACH resources may include preamble codes, time-domain resources and/or frequency-domain resources carried in a system message or an RRC message issued by the network device for the random access process.

The dedicated RACH resources may include at last one of: preamble codes, time-domain resources and/or frequency resources reserved by the network device for the random access process; RACH resources reserved by the network device for the random access process and associated with dedicated SS blocks and/or the CSI-RSs; and RACH resources reserved by the network device for the random access process and selected from the common RACH resources.

The RACH resources reserved by the network device for the random access process and selected from the common RACH resources may include preamble codes, time-domain resources and/or frequency-domain resources reserved by the network device for the random access process and selected from the common RACH resources.

To be specific, the processor 501 is further configured to execute the computer program so as to acquire the candidate RACH resources and the SS blocks and/or CSI-RSs associated with the candidate RACH resources.

The additional RACH resources may include at least one of: RACH resources reserved by the network device for the random access process; RACH resources other than the common RACH resources and the dedicated RACH resources; and RACH resources associated with the other SS blocks and/or CSI-RSs. The other SS blocks may be SS blocks other than the SS blocks associated with the common RACH resources and the dedicated RACH resources, and the other CSI-RSs may be CSI-RSs other than the CSI-RSs associated with the common RACH resources and the dedicated RACH resources.

To be specific, the processor 501 is further configured to execute the computer program so as to acquire the candidate RACH resources for the random access process with a handover function.

To be specific, the processor 501 is further configured to execute the computer program so as to: receive a handover command from the network device and acquire the candidate RACH resources for the random access process with the handover function from the handover command; or receive high-layer signaling from the network device and acquire the candidate RACH resources for the random access process with the handover function from the high-layer signaling; or acquire a neighboring cell system message and acquire the candidate RACH resources for the random access process with the handover function from the neighboring cell system message.

To be specific, the processor 501 is further configured to execute the computer program so as to: receive the high-layer signaling carrying a mobility control message from the network device; and acquire the candidate RACH resources for the random access process with the handover function from the mobility control message carried in the high-layer signaling.

To be specific, the processor 501 is further configured to execute the computer program so as to receive the handover command carrying at least a part of minimum SI from the network device.

To be specific, the processor 501 is further configured to execute the computer program so as to: acquire first M RACH resources right after receiving the handover command from the candidate RACH resources, M being an integer greater than or equal to 1; and determine the target RACH resource in accordance with the first M RACH resources.

To be specific, the processor 501 is further configured to execute the computer program so as to: acquire the first M candidate RACH resources right after receiving the handover command from the candidate RACH resources; or acquire first M contention-free RACH resources right after receiving the handover command from the candidate RACH resources; or first M RACH resources associated with SS blocks and/or CSI-RSs whose signaling quality is greater than a predetermined threshold right after receiving the handover command from the candidate RACH resources; or acquire first M contention-free RACH resources associated with the SS blocks and/or CSI-RSs whose signal quality is greater than the predetermined threshold right after receiving the handover command from the candidate RACH resources as the target RACH resource; or acquire first M RACH resources with best beam reception quality right after receiving the handover command from the candidate RACH resources; or acquire first M contention-free RACH resources with the best beam reception quality right after receiving the handover command from the candidate RACH resources.

To be specific, the processor 501 is further configured to execute the computer program so as to receive the neighboring cell system message, or read the neighboring cell system message stored in the UE.

To be specific, the processor 501 is further configured to execute the computer program so as to: select the target RACH resource from the candidate RACH resources in accordance with the SS blocks and/or CSI-RSs associated with the candidate RACH resources; or select the target RACH resource from the candidate RACH resources in accordance with the beam reception quality of downlink beams corresponding to the candidate RACH resources; or select the target RACH resource from the candidate RACH resources in accordance with a predetermined priority level.

To be specific, the processor 501 is further configured to execute the computer program so as to determine the candidate RACH resources associated with the SS blocks and/or CSI-RSs whose signal quality is greater than a first threshold as the target RACH resource.

To be specific, the processor 501 is further configured to execute the computer program so as to determine contention-free RACH resources in the candidate RACH resources associated with the SS blocks and/or CSI-RSs whose signal quality is greater than the first threshold as the target RACH resource.

To be specific, the processor 501 is further configured to execute the computer program so as to determine the candidate RACH resources corresponding to first N beams with the best beam reception quality as the target RACH resource, where N is a positive integer.

To be specific, the processor 501 is further configured to execute the computer program so as to determine contention-free RACH resources in the candidate RACH resources corresponding to the first N beams with the best beam reception quality as the target RACH resource.

To be specific, the processor 501 is further configured to execute the computer program so as to transmit the preamble codes for the random access process to the network device through the target RACH resource.

To be specific, when the UE has a capability of monitoring P downlink beams simultaneously, the processor 501 is further configured to execute the computer program so as to: transmit X preamble codes to the network device through the target RACH resource before the end of an RAR window, X and P being each a positive integer, and X being smaller than or equal to P; and transmit other preamble codes to the network device after the end of the RAR window. The other preamble codes may include preamble codes other than the P preamble codes.

To be specific, the processor 501 is further configured to execute the computer program so as to monitor an RAR on a downlink beam corresponding to the SS block and/or CSI-RS associated with each RACH resource for the transmission of the preamble code.

To be specific, when the UE has a capability of monitoring Q downlink beams simultaneously, the processor 501 is further configured to execute the computer program so as to: monitor Y RARs on the downlink beams corresponding to the SS blocks and/or CSI-RSs associated with the target RACH resources for the transmission of Y preamble codes, Q and Y being each a positive integer, and Y being smaller than or equal to Q; and select on its own initiative to monitor Q RARs on the downlink beams corresponding to the SS blocks and/or CSI-RSs associated with the target RACH resource for the transmission of Y' preamble codes, Q being greater than M.

To be specific, the processor 501 is further configured to execute the computer program so as to determine the candidate RACH resources associated with the SS blocks and/or CSI-RSs acquired from the network device as the target RACH resource.

To be specific, the processor 501 is further configured to execute the computer program so as to transmit the preamble codes for the random access process to the network device through the candidate RACH resources associated with the SS blocks and/or CSI-RSs acquired from the network device.

To be specific, when L SS blocks and/or CSI-RSs have been received by the UE, the processor 501 is further configured to execute the computer program so as to transmit L' preamble codes to the network device through the RACH resources associated with the SS blocks and/or CSI-RSs acquired from the network device before the end of the RAR window, where L and L' are each a positive integer, and L' is smaller than or equal to L.

The UE may be a wireless UE or a wired UE. The wireless UE may be a device capable of providing voice data and/or any other service data to a user, e.g., a handheld device having a wireless connection function, or any other processing device capable of being connected to a wireless modem. The wireless UE may communicate with one or more core networks via a Radio Access Network (RAN). The wireless UE may be a mobile terminal, e.g., a mobile phone (or cellular phone), or a computer having the mobile terminal, e.g., a portable, pocket-sized, handheld, built-in or vehicle-mounted mobile device, which are capable of exchanging voice and/or data with the RAN. For example, the wireless UE may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal may also be called as system, subscriber unit, subscriber station, mobile station, mobile, remote station, remote terminal, access terminal, user terminal, user agent or user device, which will not be particularly defined herein.

According to the embodiments of the present disclosure, the UE may acquire the candidate RACH resources configured by the network device, determine the target RACH resource from the candidate RACH resources, and initiate the random access process through the target RACH resource. As a result, it is able for the UE to rapidly and reliably access the network through an appropriate random access resource when there are various random access resources concurrently, thereby to achieve a desired specific purpose, e.g., RRC connection, RRC connection re-establishment and handover. Particularly, in the handover scenario, it is able for the UE to rapidly access the target cell, thereby to achieve the handover process rapidly.

The random access method for the UE has been described hereinabove, and a random access method for the network device will be described hereinafter in conjunction with the drawings.

Figure 6:
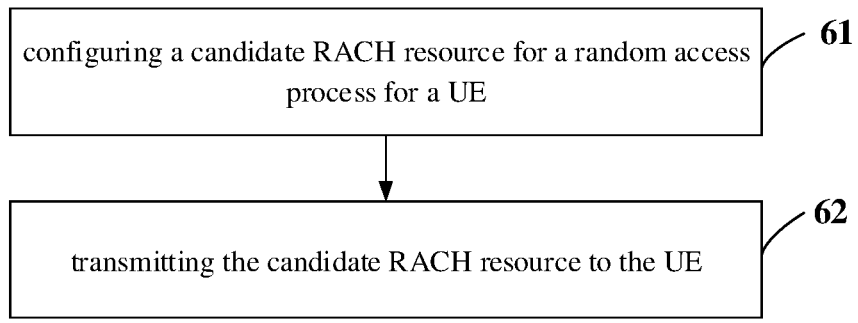
FIG. 6 is a flow chart of a random access method for a network device according to one embodiment of the present disclosure.

The present disclosure further provides in some embodiments a random access device for a network device which, as shown in FIG. 6, includes Steps 61 and 62.

Step 61: configuring a candidate RACH resource for a random access process for a UE.

Various purposes may be achieved via the random access process, e.g., the initial RRC connection establishment, the RRC connection re-establishment, handover, the arrival of downlink data with downlink asynchronization, the arrival of uplink data with uplink asynchronization, the switch of the UE from an inactive state to an active state, and the uplink synchronization acquisition of an Scell. Hence, the network device may configure different RACH resources for the UE depending on different purposes for the random access process. Here, the acquiring the candidate RACH resources may especially include acquiring candidate RACH resources for a random access process with a specific purpose.

To be specific, Step 61 may include configuring the candidate RACH resources for the random access process and SS blocks and/or CSI-RSs associated with the candidate resources for the UE. In other words, there is a mapping between each candidate RACH resource and a corresponding downlink SS block and/or CSI-RS, i.e., the candidate RACH resources and the downlink SS blocks and/or CSI-RSs may occur in pairs. When the candidate RACH resources have been configured by the network device for the UE, an SS block and/or CSI-RS must be configured.

Step 62: transmitting the candidate RACH resources to the UE.

The candidate RACH resources may include at least one of common RACH resources, dedicated RACH resources and additional RACH resources. The network device may transmit the candidate RACH resources to the UE, so that the UEU selects a target RACH resource for the random access process from the candidate RACH resources.

Further, the common RACH resources may include preamble codes, time-domain resources and/or frequency-domain resources carried in a system message or an RRC message issued by the network device for the random access process.

The dedicated RACH resources may include at last one of: preamble codes, time-domain resources and/or frequency resources reserved by the network device for the random access process; RACH resources reserved by the network device for the random access process and associated with dedicated SS blocks and/or the CSI-RSs; and RACH resources reserved by the network device for the random access process and selected from the common RACH resources. The RACH resources reserved by the network device for the random access process and selected from the common RACH resources may include preamble codes, time-domain resources and/or frequency-domain resources reserved by the network device for the random access process and selected from the common RACH resources. The dedicated RACH resources may be applied to a contention-free-based random access process or a contention-based random access process.

The additional RACH resources may include at least one of: RACH resources reserved by the network device for the random access process; RACH resources other than the common RACH resources and the dedicated RACH resources; and RACH resources associated with the other SS blocks and/or CSI-RSs. The other SS blocks may be SS blocks other than the SS blocks associated with the common RACH resources and the dedicated RACH resources, and the other CSI-RSs may be CSI-RSs other than the CSI-RSs associated with the common RACH resources and the dedicated RACH resources. Identically, the additional RACH resources may be applied to the contention-free-based random access process or the contention-based random access process. The SS blocks and CSI-RSs corresponding to the common RACH resources, the dedicated RACH resources and the additional RACH resources may be any other reference signals.

Taking the random access process with a handover function as an example, Step 61 may include configuring the candidate RACH resources for the random access process with the handover function for the UE.

The configuring the candidate RACH resources for the random access process with the handover function for the UE may include transmitting a handover command carrying the candidate RACH resources for the random access process with the handover function to the UE. At least a part of, i.e., a part of or all of, minimum SI may be further carried in the handover command. To be specific, a source base station may transmit a handover request to a target base station. The target base station may perform access control, transmit a handover acknowledgement message to the source base station after the access is allowed, and transmit configuration information necessary for the UE to access the target base station to the source base station through the handover acknowledgement message. The source base station may transmit a handover command to the UE, and the handover command may carry the configuration information from the target base station.

Alternatively, the configuring the candidate RACH resources for the random access process with the handover function for the UE may include transmitting high-layer signaling carrying the candidate RACH resources for the random access process with the handover function to the UE. To be specific, a mobility control message carrying the candidate RACH resources for the random access process with the handover function may be transmitted to the UE through the high-layer signaling. In other words, the network device may transmit the mobility control message carrying the candidate RACH resources to the UE.

Alternatively, the configuring the candidate RACH resources for the random access process with the handover function for the UE may include broadcasting SI carrying the candidate RACH resources for the random access process with the handover function. In other words, the network device may transmit the candidate RACH resources for the random access process with the handover function to the UE or a UE in a neighboring cell through broadcasting the SI.

According to the random access method in the embodiments of the present disclosure, the network device may configure one or more candidate RACH resources for the UE and transmit the one or more candidate RACH resources to the UE. As a result, it is able for the UE to determine the target RACH resource for the random access process from the candidate RACH resources, thereby to normally implement the random access processes with different purposes. Especially, in a handover scenario, it is able for the UE to rapidly access a target cell, thereby to achieve the handover process rapidly.

The random access method in different scenarios has been described hereinbefore. The corresponding network device will be described hereinafter in conjunction with the drawings and embodiments.

Figure 7:
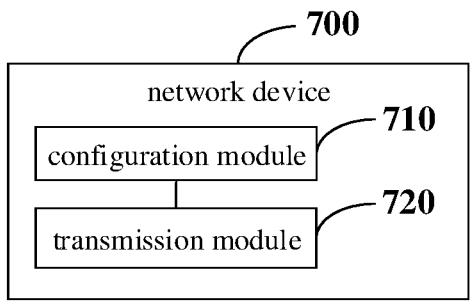
FIG. 7 is a schematic view showing the network device according to one embodiment of the present disclosure.

As shown in FIG. 7, the present disclosure further provides in some embodiments a network device 700 capable of implementing the above-mentioned random access method with a same technical effect. The network device 700 may include: a configuration module 710 configured to configure a candidate RACH resource for a random access process for a UE; and a transmission module 720 configured to transmit the candidate RACH resource to the UE so that the UE selects a target RACH resource for initiating the random access process from the candidate RACH resources, the candidate RACH resources including at least one of common RACH resources, dedicated RACH resources and additional RACH resources.

The common RACH resources may include preamble codes, time-domain resources and/or frequency-domain resources carried in a system message or an RRC message issued by the network device for the random access process.

The dedicated RACH resources may include at last one of: preamble codes, time-domain resources and/or frequency resources reserved by the network device for the random access process; RACH resources reserved by the network device for the random access process and associated with dedicated SS blocks and/or the CSI-RSs; and RACH resources reserved by the network device for the random access process and selected from the common RACH resources.

The RACH resources reserved by the network device for the random access process and selected from the common RACH resources may include preamble codes, time-domain resources and/or frequency-domain resources reserved by the network device for the random access process and selected from the common RACH resources.

The configuration module 710 may include a first configuration sub-module configured to configure the candidate RACH resources for the random access process and SS blocks and/or CSI-RSs associated with the candidate RACH resources for the UE.

The additional RACH resources may include at least one of: RACH resources reserved by the network device for the random access process; RACH resources other than the common RACH resources and the dedicated RACH resources; and RACH resources associated with the other SS blocks and/or CSI-RSs. The other SS blocks may be SS blocks other than the SS blocks associated with the common RACH resources and the dedicated RACH resources, and the other CSI-RSs may be CSI-RSs other than the CSI-RSs associated with the common RACH resources and the dedicated RACH resources.

The configuration module 710 may include a second configuration sub-module configured to configure the candidate RACH resources for the random access process with a handover function for the UE.

The second configuration sub-module may include: a first configuration unit configured to transmit a handover command carrying the candidate RACH resources for the random access process with the handover function to the UE; or a second configuration unit configured to transmit high-layer signaling carrying the candidate RACH resources for the random access process with the handover function to the UE; or a third configuration unit configured to broadcast a system message carrying the candidate RACH resources for the random access process with the handover function.

The handover command may further carry at least a part of minimum SI.

The transmission module 720 may further include a third transmission sub-module configured to transmit a mobility control message carrying the candidate RACH resources for the random access process with the handover function to the UE through the high-layer signaling.

It should be appreciated that, according to the embodiments of the present disclosure, the network device may configure the one or more candidate RACH resources for the UE and transmit the one or more candidate RACH resources to the UE. As a result, it is able for the UE to determine the target RACH resource for the random access process from the candidate RACH resources, thereby to normally implement the random access processes with different purposes.

Especially, in a handover scenario, it is able for the UE to rapidly access a target cell, thereby to achieve the handover process rapidly.

It should be further appreciated that, the above modules of the network device and the UE are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned devices. In addition, it may be stored in the memory of the above-mentioned devices in the form of a program code, and may be called and executed by a processing element of the above-mentioned devices so as to achieve the above functions of the determination module. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

In order to achieve the above-mentioned purposes in a better manner, the present disclosure further provides in some embodiments a network device which includes a processor, a memory, and a computer program stored in the memory and executed by the processor. The processor is configured to execute the computer program so as to implement the above-mentioned random access method. The present disclosure further provides in some embodiments a computer-readable storage medium storing therein a computer program. The computer program is executed by a processor so as to implement the above-mentioned random access method.

Figure 8:
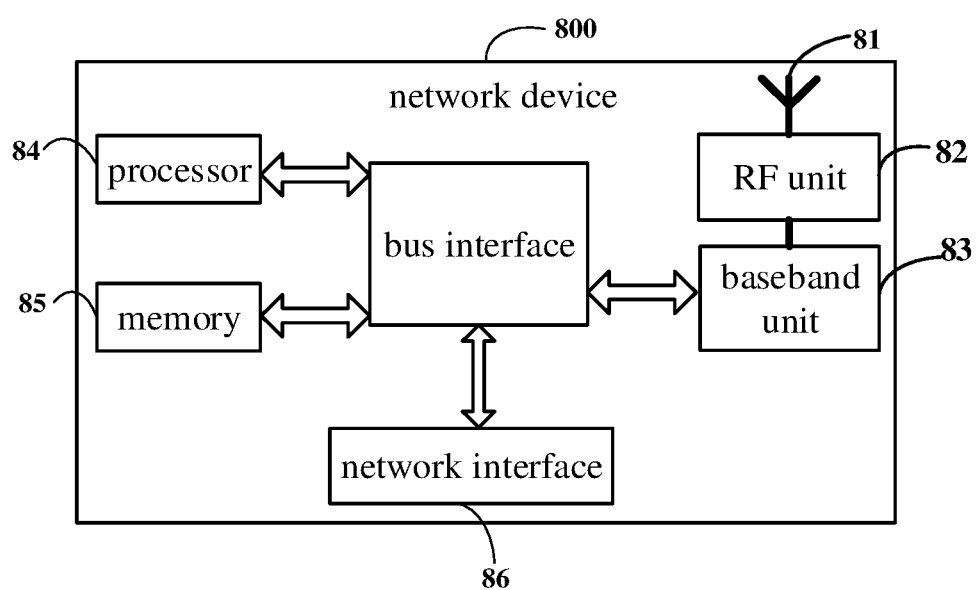
FIG. 8 is a block diagram of the network device according to one embodiment of the present disclosure.

The present disclosure further provides in some embodiments a network device 800 which, as shown in FIG. 8, includes an antenna 81, a radio frequency (RF) unit 82, and a baseband unit 83. The antenna 81 is connected to the RF unit 82. In an uplink direction, the RF unit 82 is configured to receive information via the antenna 81, and transmit the received information to the baseband unit 83 for processing. In a downlink direction, the baseband unit 83 is configured to process to-be-transmitted information, and transmit the processed information to the RF unit 82. The RF unit 82 is configured to process the received information and transmit the processed information via the antenna 81.

A frequency band processing unit may be located within the baseband unit 83, so that the above method for the network device may be implemented within the baseband unit 83. The baseband unit 83 may include a processor 84 and a memory 85.

The baseband unit 83 may, e.g., include at least one baseband board on which a plurality of chips is located, as shown in FIG. 8. One chip may be, e.g., the processor 84 connected to the memory 85 and configured to call a program stored in the memory 85 so as to perform operations for the network device in the above-mentioned method embodiments.

The baseband unit 83 may further include a network interface 86 configured to exchange information with the RF unit 82. The network interface may be, e.g., a Common Public Radio Interface (CPRI).

Here, the processor may include merely one processor, or a plurality of processing elements. For example, the processor may be a CPU, an ASIC, or one or more ICs configured to implement the above-mentioned method for the network device, e.g., one or more DSPs, or one or more FPGAs. The memory may include merely one memory, or a plurality of storage elements.

The memory 85 may be a volatile memory, a nonvolatile memory or both. The nonvolatile memory may be a Read-Only Memory (ROM), a Programmable ROM (PROM), an Erasable PROM (EPROM), an electrically EPROM (EE-PROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ES-DRAM), Synchronous Link DRAM (SLDRAM) or Direct Rambus RAM (DRRAM). The memory 85 intends to include, but not limited to, the above-mentioned and any other appropriate memories.

To be specific, in some embodiments of the present disclosure, the network device may further include a computer program stored in the memory 85 and executed by the processor 84. The processor 84 is configured to call the computer program in the memory 85 so as to implement the method executed by the modules in FIG. 7.

To be specific, the processor 84 is configured to call the computer program, so as to: configure a candidate RACH resource for a random access process for a UE; and transmit the candidate RACH resource to the UE so that the UE selects a target RACH resource for initiating the random access process from the candidate RACH resource. The candidate RACH resource may include at least one of common RACH resources, dedicated RACH resources and additional RACH resources.

To be specific, the common RACH resources may include preamble codes, time-domain resources and/or frequency-domain resources carried in a system message or an RRC message issued by the network device for the random access process.

The dedicated RACH resources may include at last one of: preamble codes, time-domain resources and/or frequency resources reserved by the network device for the random access process; RACH resources reserved by the network device for the random access process and associated with dedicated SS blocks and/or the CSI-RSs; and RACH resources reserved by the network device for the random access process and selected from the common RACH resources.

The RACH resources reserved by the network device for the random access process and selected from the common RACH resources may include preamble codes, time-domain resources and/or frequency-domain resources reserved by the network device for the random access process and selected from the common RACH resources.

To be specific, the processor 84 is further configured to call the computer program so as to configure the candidate RACH resources for the random access process and SS blocks and/or CSI-RSs associated with the candidate RACH resources for the UE.

The additional RACH resources may include at least one of: RACH resources reserved by the network device for the random access process; RACH resources other than the common RACH resources and the dedicated RACH resources; and RACH resources associated with the other SS blocks and/or CSI-RSs. The other SS blocks may be SS blocks other than the SS blocks associated with the common RACH resources and the dedicated RACH resources, and the other CSI-RSs may be CSI-RSs other than the CSI-RSs associated with the common RACH resources and the dedicated RACH resources.

To be specific, the processor 84 is further configured to call the computer program so as to configure the candidate RACH resources for the random access process with a handover function for the UE.

To be specific, the processor 84 is further configured to call the computer program so as to: transmit a handover command carrying the candidate RACH resources for the random access process with the handover function to the UE; or transmit high-layer signaling carrying the candidate RACH resources for the random access process with the handover function to the UE; or broadcast a system message carrying the candidate RACH resources for the random access process with the handover function.

The handover command may further carry at least a part of minimum SI.

To be specific, the processor 84 is further configured to call the computer program so as to transmit a mobility control message carrying the candidate RACH resources for the random access process with the handover function to the UE through the high-layer signaling.

The network device may be a Base Transceiver Station (BTS) in a Global System of Mobile Communication (GSM) system or a Code Division Multiple Access (CDMA) system, a Node B (NB) in a Wideband Code Division Multiple Access (WCDMA) system, an Evolved Node B (eNB, or eNodeB) in an LTE system, a relay or an access point, or a base station in a 5G network, which will not be particularly defined herein.

According to the embodiments of the present disclosure, the network device may configure the one or more candidate RACH resources for the UE and transmit the one or more candidate RACH resources to the UE. As a result, it is able for the UE to determine the target RACH resource for the random access process from the candidate RACH resources, thereby to normally implement the random access processes with different purposes. Especially, in a handover scenario, it is able for the UE to rapidly access a target cell, thereby to achieve the handover process rapidly.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A random access method applied for a User Equipment (UE), comprising:
    acquiring a plurality of candidate Random Access Channel (RACH) resources;
    selecting a target RACH resource from the plurality of candidate RACH resources, the candidate RACH resources comprising at least one of a common RACH resource, a dedicated RACH resource or an additional RACH resource and comprising both a contention-based RACH resource and a contention-free RACH resource; and
    initiating a random access process through the target RACH resource;
    wherein the selecting the target RACH resource from the plurality of candidate RACH resources comprises: comparing a signal quality of SS block and/or CSI-RS associated with each of the plurality of candidate RACH resources with a single first threshold to obtain a set of RACH resources associated with SS blocks and/or CSI-RSs whose signal qualities are greater than the single first threshold, and determining a contention-free RACH resource in the obtained set of RACH resources as the target RACH resource.

2. The random access method according to claim 1, wherein the common RACH resource comprise a preamble code, a time-domain resource and/or a frequency-domain resource carried in a system message or a Radio Resource Control (RRC) message issued by the network device for the random access process.

3. The random access method according to claim 1, wherein the dedicated RACH resource comprise at last one of: a preamble code, a time-domain resource and/or a frequency resource reserved by the network device for the random access process; a RACH resource reserved by the network device for the random access process and associated with dedicated Synchronization Signal (SS) blocks and/or the Channel State Information Reference Signals (CSI-RSs); and a RACH resource reserved by the network device for the random access process and selected from the common RACH resource.

4. The random access method according to claim 3, wherein the RACH resource reserved by the network device for the random access process and selected from the common RACH resource comprise a preamble code, a time-domain resource and/or a frequency-domain resource reserved by the network device for the random access process and selected from the common RACH resource.

5. The random access method according to claim 1, wherein the acquiring the plurality of candidate RACH resources comprises acquiring the candidate RACH resources and the SS blocks and/or CSI-RSs associated with the candidate RACH resources.

6. The random access method according to claim 1, wherein the additional RACH resource comprise at least one of: a RACH resource reserved by the network device for the random access process; a RACH resource other than the common RACH resource and the dedicated RACH resource; and a RACH resource associated with other SS blocks and/or CSI-RSs, wherein the other SS blocks are SS blocks other than the SS blocks associated with the common RACH resource and the dedicated RACH resource, and the other CSI-RSs are CSI-RSs other than the CSI-RSs associated with the common RACH resource and the dedicated RACH resource.

7. The random access method according to claim 1, wherein the acquiring the plurality of candidate RACH resources comprises acquiring the candidate RACH resources for the random access process with a handover function.

8. The random access method according to claim 7, wherein the acquiring the candidate RACH resources for the random access process with the handover function comprises: receiving a handover command from the network device and acquiring the candidate RACH resources for the random access process with the handover function from the handover command; or receiving high-layer signaling from the network device and acquiring the candidate RACH resources for the random access process with the handover function from the high-layer signaling; or acquiring a neighboring cell system message and acquiring the candidate RACH resources for the random access process with the handover function from the neighboring cell system message.

9. The random access method according to claim 8, wherein the acquiring the high-layer signaling from the network device and acquiring the candidate RACH resources for the random access process with the handover function from the high-layer signaling comprises: receiving the high-layer signaling carrying a mobility control message from the network device; and acquiring the candidate RACH resources for the random access process with the handover function from the mobility control message carried in the high-layer signaling.

10. The random access method according to claim 8, wherein the selecting the target RACH resource from the plurality of candidate RACH resources comprises: acquiring first M RACH resources that meet a predetermined condition right after receiving the handover command from the candidate RACH resource, M being an integer greater than or equal to 1; and determining the first M RACH resources as the target RACH resource.

11. The random access method according to claim 10, wherein the acquiring the first M RACH resources that meet the predetermined condition right after receiving the handover command from the candidate RACH resource comprises: acquiring the first M candidate RACH resources right after receiving the handover command from the candidate RACH resource; or acquiring first M contention-free RACH resources right after receiving the handover command from the candidate RACH resource; or acquiring first M RACH resources associated with SS blocks and/or CSI-RSs whose signaling quality is greater than a predetermined threshold right after receiving the handover command from the candidate RACH resource; or acquiring first M contention-free RACH resources associated with the SS blocks and/or CSI-RSs whose signal quality is greater than the predetermined threshold right after receiving the handover command from the candidate RACH resource as the target RACH resource; or acquiring first M RACH resources with best beam reception quality right after receiving the handover command from the candidate RACH resource; or acquiring first M contention-free RACH resources with the best beam reception quality right after receiving the handover command from the candidate RACH resource.

12. The random access method according to claim 8, wherein the acquiring the neighboring cell SI comprises receiving the neighboring cell system message, or reading the neighboring cell system message stored in the UE.

13. The random access method according to claim 1, wherein the initiating the random access process through the target RACH resource comprises transmitting the preamble codes for the random access process to the network device through the target RACH resource.

14. The random access method according to claim 13, wherein subsequent to transmitting the preamble codes for the random access process to the network device through the target RACH resource, the random access method further comprises monitoring a random access response (RAR) on a downlink beam corresponding to the SS block and/or CSI-RS associated with each RACH resource for the transmission of the preamble code.

15. A UE, comprising a processor, a memory, and a computer program stored in the memory and executed by the processor, wherein the processor is configured to execute the computer program so as to implement the random access method according to claim 1.

16. A random access method applied for a network device, comprising:
configuring a plurality of candidate RACH resources for a random access process for a UE; and
transmitting the plurality of candidate RACH resources to the UE so that the UE selects a target RACH resource for initiating the random access process from the plurality of candidate RACH resources, the candidate RACH resources comprising at least one of a common RACH resource, a dedicated RACH resource or an additional RACH resource and comprising both a contention-based RACH resource and a contention-free RACH resource;
wherein the candidate RACH resources are used for the UE to compare a signal quality of SS block and/or CSI-RS associated with each of the candidate RACH resources with a single first threshold to obtain a set of RACH resources associated with SS blocks and/or CSI-RSs whose signal qualities are greater than the single first threshold, and determine a contention-free RACH resource in the obtained set of RACH resources as the target RACH resource.

17. A network device, comprising a processor, a memory, and a computer program stored in the memory and executed by the processor, wherein the processor is configured to execute the computer program so as to implement the random access method according to claim 16.

* * * * *